United States Patent
Xu et al.

(10) Patent No.: US 8,056,531 B2
(45) Date of Patent: Nov. 15, 2011

(54) SHALLOW PISTON BOWL AND INJECTOR SPRAY PATTERN FOR A GASOLINE, DIRECT-INJECTION ENGINE

(75) Inventors: Zheng Xu, Canton, MI (US); Jianwen James Yi, Canton, MI (US); Steven Wooldridge, Saline, MI (US); David Bruce Reiche, Livonia, MI (US); Neal James Corey, Canton, MI (US); Stephen George Russ, Canton, MI (US); Steven Paul Penkevich, New Hudson, MI (US); Claudia Olivia Lyer, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 12/822,296

(22) Filed: Jun. 24, 2010

(65) Prior Publication Data

US 2011/0162621 A1    Jul. 7, 2011

(51) Int. Cl.
*F02B 5/00* (2006.01)
*F02F 3/00* (2006.01)

(52) U.S. Cl. ........................ 123/305; 123/280

(58) Field of Classification Search ............ 123/305, 123/276, 279, 298, 306, 308, 280
See application file for complete search history.

(56) References Cited

U.S. PATENT DOCUMENTS

| | | | |
|---|---|---|---|
| 2,810,377 A | 10/1957 | Weissenbach | |
| 3,797,466 A | 3/1974 | Nambu | |
| 4,522,173 A | 6/1985 | Agache | |
| 5,115,774 A | 5/1992 | Nomura et al. | |
| 5,209,200 A | 5/1993 | Ahern et al. | |
| 5,941,207 A | 8/1999 | Anderson et al. | |
| 6,035,822 A * | 3/2000 | Suzuki et al. | 123/276 |
| 6,223,715 B1 * | 5/2001 | Suzuki | 123/276 |
| 6,269,789 B1 | 8/2001 | Abe et al. | |
| 6,269,790 B1 * | 8/2001 | Yi et al. | 123/305 |
| 6,460,509 B1 | 10/2002 | Muramatsu et al. | |
| 6,742,493 B2 | 6/2004 | Ziegler et al. | |
| 6,782,867 B2 | 8/2004 | Nakayama et al. | |
| 6,854,439 B2 | 2/2005 | Regueiro | |
| 6,983,733 B2 | 1/2006 | Yamashita et al. | |
| 7,418,940 B1 | 9/2008 | Yi et al. | |
| 7,571,708 B2 | 8/2009 | Zahdeh | |
| 2003/0172896 A1 | 9/2003 | Sczepanski et al. | |
| 2008/0072948 A1 | 3/2008 | McGilvray et al. | |
| 2008/0245342 A1 | 10/2008 | Werner | |

FOREIGN PATENT DOCUMENTS

| | | |
|---|---|---|
| EP | 1069291 A2 | 1/2001 |
| EP | 1517017 A1 | 3/2005 |
| JP | 1124042 U1 | 8/1989 |
| JP | 8312354 A | 11/1996 |

\* cited by examiner

*Primary Examiner* — Hieu T Vo
(74) *Attorney, Agent, or Firm* — Julia Voutyras; Brooks Kushman P.C.

(57) ABSTRACT

A combustion system for a direct-injection, spark-ignition engine is disclosed. A side-mounted fuel injector located outboard the intake valves directs multiple fuel jets into a shallow, spherical bowl formed in a domed piston. Both good mixing to facilitate good air utilization with early injection and an ignitable mixture at the spark plug with late injection to facilitate cold start are provided with such a combustion system. Because the bowl is smooth and shallow, the surface area of the combustion chamber is less than with a deeper bowl of complicated shape. Lowering surface area in the combustion chamber leads to improved fuel economy.

18 Claims, 3 Drawing Sheets

SHALLOW PISTON BOWL AND INJECTOR SPRAY PATTERN FOR A GASOLINE, DIRECT-INJECTION ENGINE

BACKGROUND

1. Technical Field

The present disclosure relates to a piston bowl design and fuel injector spray pattern for direct-injection, spark-ignition internal combustion engines.

2. Background Art

Direct injection of fuel into the combustion chamber of a gasoline direct injection (GDI) internal combustion engine potentially saves fuel, reduces emissions, and increases torque/power compared with conventional port fuel injection (PFI) engines. Fuel is sprayed directly into the combustion chamber where it vaporizes and mixes with air and is later ignited by a spark plug. The main fuel saving mechanism of homogeneous charge GDI is charge cooling from the fuel vaporization process that allows a higher compression ratio for more efficient engine operation. Charge cooling is also responsible for the increased torque potential of GDI engines via higher volumetric efficiency at full load. Air inducted into the engine is denser due to charge cooling, thereby allowing more air to be inducted and more power to be produced. Reduced emissions from GDI engines are possible compared with PFI engines due to stratified charge combustion using split injection during cold start, an operating condition contributing a large fraction of emissions. Split injection produces lower emissions during cranking by minimizing injected fuel mass and reducing liquid fuel surface wetting. It also enables faster catalyst light-off through high-heat flux retarded spark timing.

GDI engines, however, potentially suffer from poorer fuel-air mixing compared with PFI engines. Mixing in GDI engines is controlled by the interaction of the fuel spray with the turbulent air flow in the cylinder. Therefore, mixing is dependent on time, the spatial distribution of the fuel spray, and the in-cylinder charge motion characteristics. To evenly distribute the fuel through the combustion chamber, the interaction between the spatial targeting of the fuel jet(s) and the air motion is optimized. Also, the time for mixing is maximized during the intake stroke. If fuel is injected too late during the intake stroke and/or the fuel is not sufficiently dispersed by the injector spray pattern targeting, there is insufficient time for vaporization and complete mixing. This results in lean and rich regions. Combustion of the rich zones results in incomplete combustion as indicated by elevated CO emissions and incomplete utilization of the oxygen in the charge mixture, and thus lower combustion efficiency leading to higher fuel consumption. If, on the other hand, fuel injection is initiated too early, fuel impinges on the piston creating a liquid film that may survive the mixing process and produce soot emissions. Generally speaking, a GDI engine has a soot/mixing tradeoff where undesirable soot emission are produced when using early start of injection (SOI) and less than optimal fuel efficiency with later SOIs.

Typically, a portion of the fuel is injected during the late compression stroke to provide a rich zone in the vicinity of the spark plug to aid in cold starting. An injector spray pattern and combustion system optimized for part load mixing alone does not necessarily provide the desired rich fuel cloud in the vicinity of the spark plug at the time of ignition for stable combustion at cold-start conditions.

A challenge lies in designing a spray pattern/combustion chamber shape that produces good mixing to reduce soot emission and provide good thermal efficiency at part load while also allowing for a stratified mixture to be formed at cold start with a rich zone at the spark plug. In some combustion systems, a deep bowl of complicated geometry is provided in the piston top to partially contain the rich fuel in a region near the spark plug to promote a rich zone for cold start robustness.

SUMMARY

A combustion system has a cylinder head having two intake valves and at least one exhaust valve, a cylinder bore coupled to the cylinder head, a spark plug mounted substantially centrally in the cylinder head, a fuel injector peripherally mounted in the cylinder head outboard the two intake valves and symmetric with respect to the intake valves, and a piston in the cylinder bore. A top of the piston has a spherical dome with a spherical bowl defined in the dome. The bowl is located generally below the intake valves. A diameter of the bowl substantially lies in a diametral plane defined by a tip of the spark plug, a tip of the injector, and a central axis of the piston.

The bowl is machined using a ball cutting tool having a diameter between 0.75 to 1.0 of a diameter of the piston. The bowl diameter is less than half the piston diameter and the bowl is positioned such that no part of the bowl lies below the exhaust valve. A point on the bowl farthest away from the fuel injector is located roughly below the spark plug. Or in alternative definition, the spark plug has a longitudinal axis and a point on the bowl farthest away from the fuel injector is located within 5 mm of the longitudinal axis.

A longitudinal axis of the fuel injector forms an angle with a center axis of the cylinder bore of at least 60 degrees. Alternatively, the angle formed between the center axis of the cylinder bore and the fuel injector axis is greater than an angle formed between the fuel injector axis and a horizontal plane perpendicular to the center axis of the cylinder bore. The fuel injector has six orifices, with two of the orifices directed toward the piston bowl and displaced on either side of the diametral plane. The fuel injector is sealed in between the two orifices directed toward the piston bowl meaning that there is no orifice in between the two orifices displaced with respect to the diametral plane.

DETAILED DESCRIPTION

As those of ordinary skill in the art will understand, various features of the embodiments illustrated and described with reference to any one of the Figures may be combined with features illustrated in one or more other Figures to produce alternative embodiments that may not be explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a four-stroke, multi-cylinder, direct-injected, spark-ignition internal combustion engine having an in-line configuration. Those of ordinary skill in the art may recognize similar applications or implementations with other engine/vehicle technologies and configurations including but not limited to in-line configurations, for example.

Figure 1:
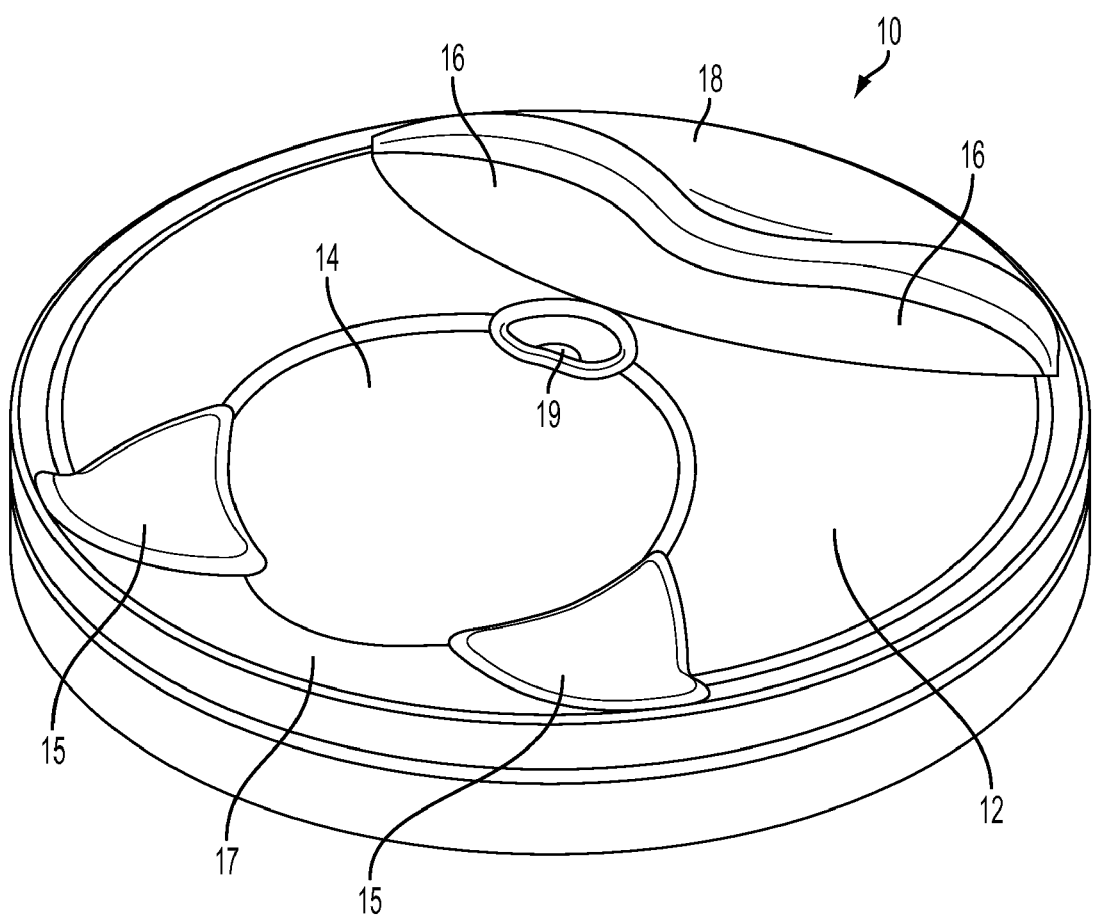
FIG. 1 shows a domed piston top portion with a shallow piston bowl and other features formed in the dome top.

FIG. 1 is an isometric drawing of a portion of a piston, ie., a top of piston 10, according to an embodiment of the disclosure. Piston 10 is machined or cast to have a dome 12, which is described geometrically as a sectioned off portion of a sphere by intersection with a plane. The dome is arranged symmetrically on the piston top such that a center of the dome is roughly coincident with a longitudinal axis of piston 10. A symmetrical dome simplifies machining compared to an offset arrangement.

Features are machined into dome 12, including: a shallow bowl 14, recesses 15 to accommodate intake valves, recesses 16 to accommodate exhaust valves, a squish region 17 proximate the intake valves, a squish region 18 proximate the exhaust valves, and a recess 19 to accommodate spark plug electrodes. Recesses 15 and 16 are provided so that intake and exhaust valves will have a minimum specified clearance with the piston dome at their limiting phasing with the engine crankshaft position. For example, the intake valves will have a clearance when phased fully advanced within the capability of the valvetrain phasing so that intake valve opening occurs before piston top dead center (TDC). Likewise, the exhaust valves will have a clearance when phased fully retarded within the capability of the valvetrain phasing so that exhaust valve closing occurs after piston top dead center (TDC). All other timings beyond these intake advance and exhaust retard will relax this clearance. A subset of the valvetrain and piston recess design is commonly called freewheeling, and also may be included. That is, piston 10 reciprocates with a cylinder bore. Intake and exhaust valves also reciprocate, with the timing of the valve open and close events being related to the piston motion through a timing belt or timing chain. Under proper timing, the valves and the piston do not collide. However, if the timing belt slips or breaks, the valves and piston potentially impact each other, which can ruin the engine. To avoid such a situation, recesses, or commonly called eyebrows, are provided in piston top 10 so that there is a small clearance between the piston at its top center position and valves stuck at their open position.

The cylinder head is not shown in FIG. 1. However, it is common to provide features on the cylinder head, which have a slight gap with squish regions 17 and 18 when piston 10 is at the top center position. Gases proximate the squish regions are forced into the main combustion chamber volume when the piston travels toward top center, thereby promoting turbulence in the combustion chamber. Also not shown in FIG. 1 is the relationship between the spark plug tip and piston 10. To accommodate the spark plug tip reaching into the combustion chamber, recess 19 is provided. It can be advantageous for the spark plug electrodes, i.e., the location where the flame kernel is initiated, to be located away from the cylinder head in a region in which there is more fluid motion. However, to facilitate a high compression ratio, the piston travels very close to the cylinder head at top center. Recess 19 provides a space for the spark plug electrodes to avoid interference with piston 10.

Bowl 14 is formed in dome 12 by a ball cutting tool. The resulting recess is dome shaped, i.e., a concave dome-shaped bowl removed from convex dome 12. An interface between bowl 14 and dome 12 is generally circular. In one embodiment, the piston is approximately 90 mm in diameter, the ball cutting tool is about 80 mm in diameter, and the bowl dimension defined by the intersection of the bowl and dome spherical dimensions is about 40 mm. Based on these dimensions the resulting bowl depth, with respect to the circular interface, is about 5 mm, which is significantly shallower than bowls on typical direct-injection engines. Advantages of such a shallow bowl include: it has a minimal impact on compression ratio, it contributes minimally to increasing surface area of the piston top, and only a single machining operation is required to form such a bowl. The example dimensions herein are not intended to be limiting. Furthermore, it is common for a cold piston to be slightly out of round so that upon expansion from heating, the warmed up piston is approximately round. Thus, the piston does not have a single value for diameter. Herein, diameter is an average diameter of the piston. To provide a shallow bowl, the diameter of the cutting tool at least 0.75 of the piston diameter. In one embodiment, the diameter of the cutting tool is in the range of 0.75 to 1.0 of the piston diameter.

Figure 2:
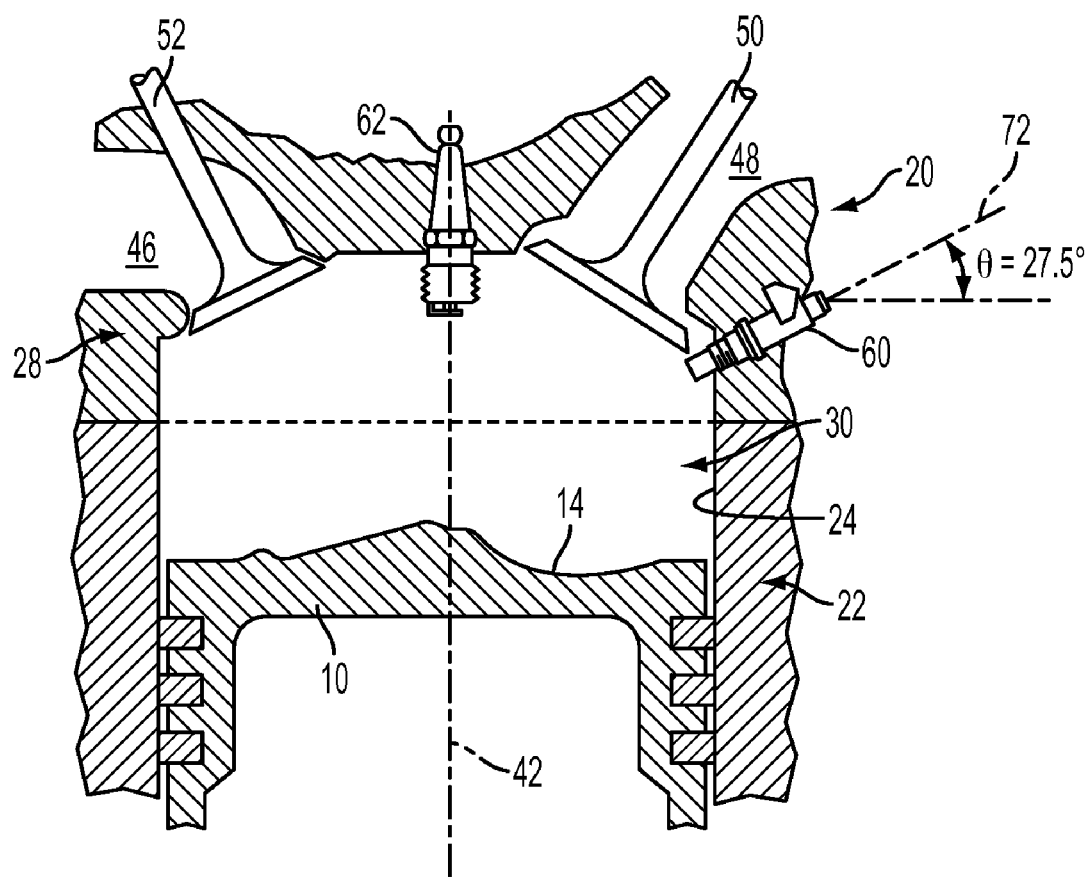
FIG. 2 is a cross section of a combustion chamber having a piston of FIG. 1.

FIG. 2 is a cross-section of a representative cylinder or combustion chamber of a multiple-cylinder, direct-injection, internal-combustion engine illustrating operation of one embodiment of a system or method for operating a direct-injection engine according to the present disclosure. Engine 20 includes an engine block 22 having a plurality of cylinder bores 24. Combustion chamber 30 is defined by cylinder head 28, cylinder bore 24, and piston 10, the latter of which reciprocates within cylinder bore 24. Cylinder head 28 includes various exhaust ports 46 and intake ports 48. As will be appreciated by those of ordinary skill in the art, although one embodiment includes two intake ports and two exhaust ports per cylinder (only one of each being shown in FIG. 2), the present disclosure also applies to engine configurations having two or more intake ports and one or more exhaust ports.

Each combustion chamber 30 includes an intake valve 50 for each intake port and an exhaust valve 52 for each exhaust port. Intake valve 50 selectively couples combustion chamber 30 to an associated intake manifold (not shown). Similarly, exhaust valve 52 selectively couples combustion chamber 30 to an associated exhaust manifold (not shown). Of course, the intake manifold and/or exhaust manifold may be integrally formed within cylinder head 28, or may be separate components depending upon the particular application. Intake valves 50 and exhaust valves 52 may be operated using any of a number of known strategies including a conventional camshaft arrangement, variable camshaft timing and/or variable lift arrangements, or using electromagnetic valve actuators, for example.

Each combustion chamber 30 includes an associated side-mounted fuel injector 60 mounted in cylinder head 28 and extending through a side portion of combustion chamber 30. The longitudinal axis 72 of fuel injector 60 is disposed at an angle relative to the cylinder longitudinal axis 42 depending upon the particular application and implementation. During operation, in response to one or more corresponding fuel injection signal(s) generated by the engine controller, fuel injector 60 sprays fuel through multiple holes or jets substantially simultaneously directly into combustion chamber 30 to create a desired fuel spray pattern.

As also illustrated in FIG. 2, each combustion chamber 30 includes an ignition source, such as a spark plug 62 that extends through the cylinder roof. Piston 10 is disposed for reciprocating movement within each cylinder bore 24 and is coupled in a conventional manner to a crankshaft by a connecting rod (not shown). As described above, piston 10 includes a domed top having a combustion bowl 14 formed therein to facilitate desired air-fuel mixture cloud formation, particularly during light stratified charge operation, such as during cold starts, for example.

The present disclosure also provides a spray pattern of a multi-hole injector design for Gasoline Direct Injection (GDI) internal combustion engines, which is optimized to reduce combustion emissions and increase the fuel efficiency of the GDI engine.

Figure 3:
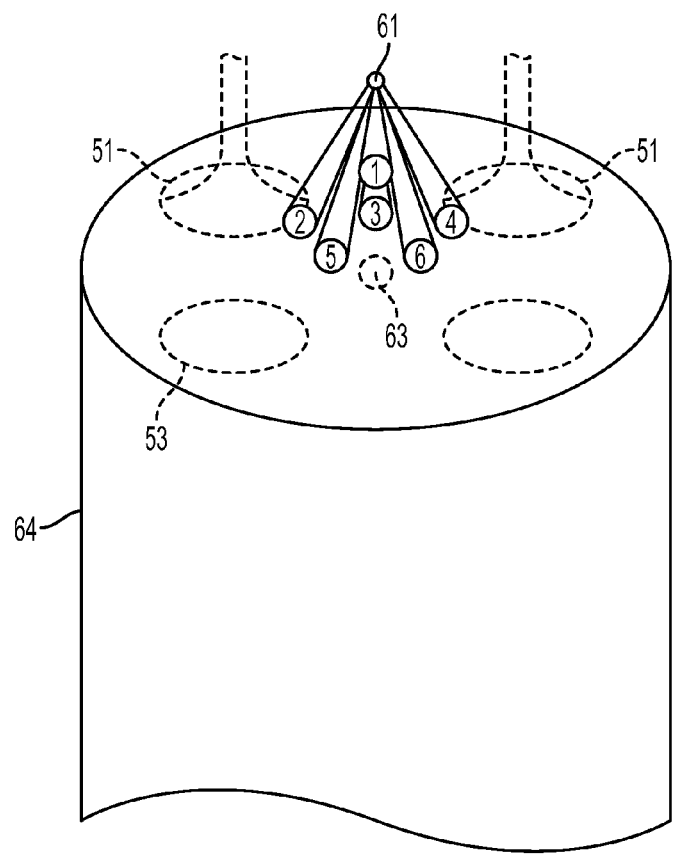
FIG. 3 is an isometric view of a combustion system illustrating distribution of six fuel injector jets from a fuel injector.

The spray pattern of a 6-hole injector, which has been optimized to reduce combustion emission and increase fuel efficiency of the GDI engine, is shown in FIG. 3. A portion of a cylinder is shown with projections 51 of the intake valves, projections 53 of the exhaust valves, and a projection 63 of the spark plug in phantom. A fuel injector tip 61 is shown having six jets 1-6 emanating from a wall in between the intake valves into the combustion chamber. Jet 1 is pointed up a bit more than the other jets, so that in the isometric view in FIG. 3, it appears shorter than the other jets. Jets 5 and 6 are directed into the bowl and appear longer in FIG. 3. However, fuel is injected simultaneously from all orifices in the injector and tips of the fuel jets are substantially equivalently far away from the injector orifices, except upon impacting a feature in the combustion chamber or being substantially impacted by the fluid flow in the combustion chamber.

Figure 4:
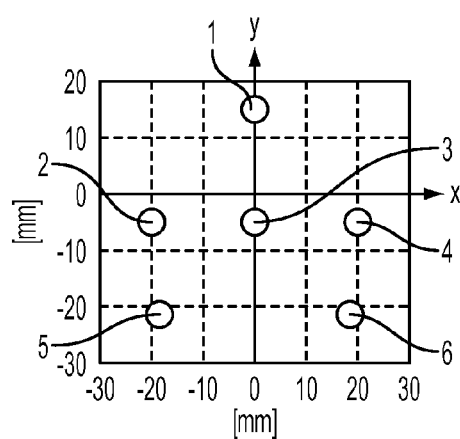
FIG. 4 is a graph of the fuel injector jet target locations after 50 mm of travel from the injector tip.

FIG. 4 and Table 1 show the individual spray targeting dimensions on a plane normal to the injector axis and 50 mm downstream from the injector tip for the injector sprays shown in FIG. 3. Note that FIG. 4 is the spray pattern downstream from the injector tip with the perspective view towards the injector tip, similar to the perspective of FIG. 3. Alpha angle is the orientation of each jet relative to the negative y-axis, positive being clockwise. Off axis angle is the 3-D angle between the jet and the injector axis. The angles are defined for an injector with a 27.5° installation angle measured from the horizontal plane or 62.5° with respect to an axis parallel to the cylinder bore. Therefore, the injector targeting detailed in Table 1 taken with a 27.5° injector installation angle indicates the actual in-cylinder spray targeting. This installation angle of the injector is provided as an example, but identical in-cylinder jet targeting can be obtained for other installation angles by adjusting the location of the jets on the injector. The jet angles in Table 1 should be considered as a range centered about the value in the table plus or minus 5°. The x, y, and z coordinates change accordingly, from the specifications in Table 1, for individual spray jets within the specified range.

TABLE 1

Injector spray plume targeting

| Jet number | Alpha, ° | off-axis angle ° | x, mm | y, mm | z, mm |
|---|---|---|---|---|---|
| 1 | 180 | 15.0 | 0 | 13.90 | −50 |
| 2 | 75.0 | 21.4 | −19.41 | −5.20 | −50 |
| 3 | 0.0 | 5.0 | 0.00 | −4.87 | −50 |
| 4 | −75.0 | 21.4 | 19.41 | −5.20 | −50 |
| 5 | 38.5 | 27.0 | −16.17 | −20.33 | −50 |
| 6 | −38.5 | 27.0 | 16.17 | −20.33 | −50 |

The spray jets were designed to avoid valve wetting and to minimize liner and piston wetting. In addition, the jets were designed to interact with a shallow bowl piston design to produce a stable stratified mixture around the spark plug for cold start stability and emissions reduction. Jets 1-4 are provided for good mixing in homogeneous-charge operation. Jets 1 and 3 spray are targeted between the intake valves and reach as far as possible on the exhaust side with minimal bore liner wetting. Jets 2 and 4 are oriented to minimize valve wetting, as valve wetting is a major source of soot. Jets 3, 5 and 6 provide good combustion stability for light stratified-charge at cold-start operation by ensuring that the jets are substantially contained in the shallow piston bowl.

It has been found that more jets targeting the piston bowl aid in producing a stable and rich mixture around the spark plug that improves cold-start combustion stability. However, the tradeoff is that higher smoke emissions result. In one background system, described in U.S. Pat. No. 7,418,940 B1, commonly assigned as the present application and incorporated herein in its entirety, three jets are aimed toward the piston bowl. That is, the system in U.S. Pat. No. 7,418,940 has an additional jet located in between jets 5 and 6 of FIG. 3 above. It has been found that such an additional jet, aimed squarely at the center of the piston bowl, is disproportionately responsible for soot emissions. Jets 5 and 6 do not contribute so much to soot production, possibly due to being targeted into the bowl at an angle.

In Table 2, combustion chamber surface area for a piston bowl similar in concept to the piston bowl shown in U.S. Pat. No. 7,418,940 is compared with the piston bowl disclosed herein.

TABLE 2

Surface area comparisons between two chambers.

| Piston | Compression ratio | Combustion chamber area (mm$^2$) | % change |
|---|---|---|---|
| U.S. Pat. No. 7,418,940 B1 | 12.03 | 19517 | Baseline |
| Disclosed herein | 11.99 | 18867 | −3.3 |

It is known that the fuel economy benefit from a 3.3% decrease in surface area is about 1%, which is approximately what was found experimentally in a single-cylinder dynamometer engine, with no deterioration of combustion stability at cold start. The data also show that the optimized injector allows earlier start of injection without smoke emissions rising, which significantly improves mixing compared with injectors in which three of the six jets are directed toward the piston bowl.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

What is claimed:

1. A combustion system, comprising:
a cylinder head having two intake valves and an exhaust valve;
a fuel injector mounted in the cylinder head outboard the intake valves;
a piston having a convex dome with a spherical concave bowl defined in the dome and located on a side of the piston proximate the intake valves and;
a spark plug mounted substantially centrally with a longitudinal axis substantially intersecting an edge of the piston bowl.

2. The combustion system of claim 1 wherein the convex dome comprises a portion of a sphere, an interface between the dome and the bowl is substantially a circle, and the diameter of the circle is less than half of a diameter of the piston.

3. The combustion system of claim 1 wherein a longitudinal axis of the fuel injector forms an angle with a center axis of the cylinder bore greater than an angle formed between the longitudinal axis of the fuel injector a horizontal plane perpendicular to the center axis of the cylinder bore.

4. The combustion system of claim 1 wherein the fuel injector has at least five orifices, with two of the orifices directed toward the piston bowl and displaced on either side of a diameter of the piston bowl in line with the fuel injector.

5. The combustion system of claim 1 wherein the fuel injector has at least five orifices with two of the orifices directed toward the piston bowl on either side of a diameter of the piston bowl in line with the fuel injector and the injector is blocked in between the two orifices.

6. The combustion system of claim 1 wherein the spherical concave bowl is formed by a tool having a diameter at least 0.75 of a diameter of the piston.

7. A combustion system, comprising:
a cylinder head having two intake valves;
a cylinder bore coupled to the cylinder head;
a piston in the cylinder bore, a top of the piston having a spherical dome with a spherical bowl defined in the dome, the bowl located generally underneath the intake valves
a spark plug mounted substantially centrally in the cylinder head; and
a fuel injector peripherally mounted in the cylinder head outboard the two intake valves and symmetric with respect to the intake valves wherein a diameter of the bowl substantially lies in a plane defined by a tip of the spark plug, a tip of the injector, and a central axis of the piston.

8. The combustion system of claim 7 wherein the bowl is machined using a ball cutting tool having a diameter between 0.75 to 1.0 of a diameter of the piston.

9. The combustion system of claim 7, further comprising:
an exhaust valve disposed in the cylinder head at a location farther away from the fuel injector than the intake valves wherein the bowl diameter is less than half the piston diameter and the bowl is positioned such that no part of the bowl lies below the exhaust valve.

10. The combustion system of claim 7 wherein a point on the bowl farthest away from the fuel injector is located roughly below the spark plug.

11. The combustion system of claim 7 wherein the spark plug has a longitudinal axis and a point on the bowl farthest away from the fuel injector is located within 5 mm of the longitudinal axis.

12. The combustion system of claim 7 wherein a point on the bowl farthest away from the fuel injector is located approximately below a point on the periphery of the spark plug farthest away from the fuel injector.

13. The combustion system of claim 7 wherein a longitudinal axis of the fuel injector forms an angle with a center axis of the cylinder bore of at least 60 degrees.

14. The combustion system of claim 7 wherein the fuel injector has six orifices, with two of the orifices directed toward the piston bowl and displaced on either side of the plane.

15. The combustion system of claim 14 wherein the fuel injector is sealed in between the two orifices directed toward the piston bowl.

16. A combustion system for an engine having fuel injectors mounted outboard of associated intake valves, comprising:
a piston having a convex dome with a spherical concave bowl defined in the dome and located on a side of the piston proximate the intake valves, wherein an interface between the dome and the bowl is substantially a circle, and the diameter of the circle is less than half of a diameter of the piston.

17. The combustion system of claim 16 wherein the spherical concave bowl is positioned generally underneath the associated intake valves.

18. The combustion system of claim 17 further comprising:
a cylinder head having two intake valves per cylinder;
a spark plug mounted substantially centrally in the cylinder head; and
a fuel injector peripherally mounted in the cylinder head outboard the two intake valves and symmetric with respect to the intake valves wherein a diameter of the bowl substantially lies in a plane defined by a tip of the spark plug, a tip of the injector, and a central axis of the piston.

* * * * *